United States Patent Office 3,701,747
Patented Oct. 31, 1972

3,701,747
PROCESS FOR MAKING A DISPERSION OF POLYMER PARTICLES IN AN ORGANIC LIQUID
Desmond Wilfred John Osmond, Windsor, Ian Wagstaff, Datchet, and Frederick Andrew Waite, Slough, England, assignors to Imperial Chemical Industries Limited, London, England
No Drawing. Continuation-in-part of application Ser. No. 682,615, Nov. 13, 1967. This application Sept. 4, 1968, Ser. No. 757,480
Claims priority, application Great Britain, Nov. 14, 1966, 50,915/66
Int. Cl. C08f 47/20; C08g 53/18; C08j 1/46
U.S. Cl. 260—33.6                                                               6 Claims

ABSTRACT OF THE DISCLOSURE

Preformed polymer particles are dispersed in organic liquids such as hydrocarbons by use of a stabiliser comprising one component solvatable by the organic liquid and another component which is relatively non-solvatable and is, in bulk, a plastic solid or viscous liquid under the conditions of the dispersion, this other component serving to attach the stabiliser to the dispersed polymer particles.

---

This is a continuation-in-part of prior U.S. application Ser. No. 682,615, filed Nov. 13, 1967, now abandoned.

This invention relates to dispersions of particles of polymers in organic liquids, in particular to such dispersions produced by re-dispersion of pre-formed particles of polymer.

Polymers commonly produced by aqueous emulsion polymerisation include polymers of (and copolymers containing a major proportion of) vinyl chloride, vinyl fluoride, methyl methacrylate, styrene, acrylonitrile, vinylidene chloride, vinylidene fluoride, vinyl acetate, and chloroprene and polybutadiene/acrylonitrile. The resulting aqueous dispersions are dried, e.g. by spray drying whilst essentially retaining the original particles size, to produce powdered polymer which is then re-dispersed in organic liquids to produce organosols and plastisols. In such organosols and plastisols the stability of the dispersion is largely dependent on the particles being partially swollen by a solvent or plasticiser and the dispersions are characterised by a high degree of flocculation of the polymer particles and by extremely non-Newtonian flow properties.

In more recently developed processes, dispersions of such polymer particles in organic liquids are produced by dispersion polymerisation of the monomer in the organic liquid in the presence of a stabiliser having an amphipathic molecular structure, i.e. a structure comprising one component which is solvated by the organic liquids and another component of different polarity which is relatively non-solvated by the organic liquid and which becomes associated with the polymer particles, thereby attaching to the particles a sterically stabilising sheath of the solvated component of the stabiliser. The two components referred to have molecular weights of at least 1,000 and the stabiliser as a whole is polymeric. Dispersions produced by such processes can have much improved flow properties as compared with conventional organosols and plastisols, so much so that they provide a very useful basis for the formulation of coating compositions. Such dispersions and processes are described in British Pat. 941,305, Belgian Pat. 676,271, French Pat. 1,455,273 and French Pat. 1,456,668.

Because of the availability in bulk of powdered polymer attempts have been made to re-disperse the powders in organic liquids using the type of stabiliser effective in dispersion polymerisation. Although dispersions can be prepared in this way they have a poor degree of stability with respect to flocculation and the dispersions are thixotropic and have poor flow characteristics.

We have found that polymer dispersions of improved flow characteristics can be obtained by dispersing preformed particles of polymer in an organic liquid in the presence of a polymeric stabiliser having an amphipathic structure provided that the associated component of the stabiliser, whilst still relatively non-solvated by the organic liquid, is a flexible, rather than rigid chain, i.e. a bulk polymer of that composition although insoluble in the organic liquid of the dispersion is, under the conditions in which the stabiliser is to be used, a plastic solid or viscous liquid, rather than a hard, tough, non-deformable or glassy solid.

A simple test for determining the suitability of an associated component is to add a bulk polymer having the composition and molecular weight of the component to the liquid of the dispersion in the proportion in which it would be present in the dispersion and allow it to equilibrate with the liquid under the conditions at which the dispersion is to be carried out, e.g. at the appropriate temperature and in the presence of organic solvent or plasticiser which may be used in the dispersion. If, when it reaches equilibrium under these conditions the polymer is in the form of a separate layer (this is indicative of adequate insolubility in the liquid) which is deformable when subjected to an applied force (e.g. a weight or the end of a loaded rod steadily sinks into the layer) then it is suitable as the associated component of a stabiliser for use under those conditions.

In general, the characteristics and inter-relationships of the disperse polymer, liquid and stabiliser are as described in the above-mentioned patents. The increase in degree of flexibility of the associated component may be brought about either by modifying the associated component or by modifying the organic liquid to increase its solvent power for the associated component, thus plasticising it, or by raising the temperature of the system. The first modification may be brought about, for example, by incorporating in a polymeric associated component, a co-monomer which by itself would produce either a very soft or liquid homopolymer or one which is soluble in the organic liquid. The second modification may be brought about by, for example, adding to the organic liquid a proportion of a solvent for the associated component, which solvent may be a plasticiser.

The associated component of the stabiliser used in dispersion polymerisation is often similar in composition to that of the disperse polymer, this largely for two reasons; firstly, the associated component should, like the disperse polymer, be substantially insoluble or non-solvated by the organic liquid of the dispersion and secondly, it is sometimes preferred that the associated component and the disperse polymer be compatible. In the case of polyvinyl chloride not only may the associated component be a similar polymer, but because of the compatibility of polyvinyl chloride and polymethyl methacrylate, it may also be a homopolymer or copolymer of methyl methacrylate.

Such associated components, in the practice of this invention, may be modified to meet the requirements described above. For example, in dispersions of polymer in non-polar organic liquids such as hydrocarbons, the flexibility of a polymeric associated component may be increased by introduction of such co-monomers as ethyl and higher alkyl acrylates, butyl and higher alkyl methacrylates, alkoxyalkyl methacrylates, e.g. β-ethoxy ethyl methacrylate, alkyl styrenes, e.g. vinyl toluene, alkenes, e.g. butene-1 or decene-1, vinyl esters or ethers and higher alkyl maleates.

Where the organic liquid of the dispersion is mainly aliphatic hydrocarbon in nature, e.g. pentane, hexane, heptane, and octane, the following are examples of suitable chain-like components which would be solvated by the liquid:

long paraffinic chains such as occur in stearic acid, self-polyesters of —OH fatty acids such as 12-OH stearic acid or the polyesters occurring in carnauba wax, polyesters of di-acids with diols, e.g. polyesters of sebacic acid with 1,12-dodecane diol or of adipic acid with neo-phenyl glycol;
polymers of long chain esters of acrylic or methacrylic acid, e.g. steary, lauryl, octyl, 2-ethyl hexyl and hexyl esters of acrylic or methacrylic acid;
polymeric vinyl esters;
polymers of butadiene and isoprene and noncrystalline polymers of ethylene and propylene.

The organic liquid may, of course, be a commercially-available hydrocarbon mixture, such as mineral spirits and white spirit, which also are suitable. Where the organic liquid is mainly aromatic hydrocarbon in nature, e.g. xylene, and xylene mixtures, benzene, toluene and other alkyl benzenes and solvent naphthas, similar solvatable components may be used and in addition, shorter chain analogues, e.g. polymer of ethoxy ethyl methacrylate, methyl methacrylate and ethyl acrylate. Other components suitable for use in this type of organic liquid include:

aromatic polyesters, e.g. non-drying oil-modified alkyd resins;
aromatic polyethers;
aromatic polycarbonates; and
polymers of styrene and vinyl toluene.

Where the organic liquid is weakly polar in nature, e.g., a higher alcohol, ketone or ester, suitable solvatable components include:

aliphatic polyethers;
polyesters of short chain acids and alcohols;
polymers of acrylic or methacrylic esters of short chain alcohols.

To illustrate the invention the following stabilisers have been used:

(A) The amphipathic macromolecule prepared by condensing a self-ester of 12-hydroxy stearic acid of mol. wt. about 1,500 with glycidyl methacrylate (to introduce an ethylenically unsaturated group) and then copolymerising this with methyl methacrylate and methacrylic acid in the weight rtio 50:49:1 to produce a poly-acrylate backbone carrying on average about 5 side chains of the stearate per molecule.

(B) A similar stabiliser to (A) but containing no methacrylic acid monomer.

(C) The amphipathic macromolecule prepared by copolymerising the above condensate of the stearate and glycidyl methacrylate with methyl methacrylate and ethyl acrylate in the weight ratio 50:25:25.

(D) The amphipathic macromolecule prepared by copolymerising the above condensate of the stearate and glycidyl methacrylate with methyl methacrylate, ethyl acrylate and methacrylic acid in the weight ratio 50:23.75:23.75:2.5.

(E) The amphipathic macromolecule prepared by copolymerising the above condensate of the stearate and glycidyl methacrylate with styrene in the weight ratio 50:50.

(F) A similar stabiliser to (B) in which the methyl methacrylate is replaced by ethyl acrylate.

The re-dispersions were carried out by ball milling 100 parts by weight of particulate P.V.C. polymer and 60 parts by weight of organic liquid containing 5 parts by weight of a stabiliser. The organic liquid was essentially a mixture of aliphatic hydrocarbon with a small proportion of aromatic hydrocarbon, the boiling range of the mixture being 150–190° C. Such mixtures are commercially available under the name "white spirit." The time of milling was 18 hours.

The following is a list of mill ingredients and comments on the flow characteristics of the dispersions obtained:

| | Particulate polymer | Stabiliser | Further liquid additive (percent on particulate polymer) | Temperature | Comment |
|---|---|---|---|---|---|
| Example: | | | | | |
| 1 | Corvic P65/55* | A | | Ambient | Thick paste. |
| 2 | do | A | 10% isodecyl phthalate | do | Fluid. |
| 3 | do | A | 5% dimethyl phthalate | do | Fluid, slightly thixotropic. |
| 4 | do | A | 5% dibutyl phthalate | do | Do. |
| 5 | do | A | | 50° C | Fluid. |
| 6 | do | B | | Ambient | Very thixotropic. |
| 7 | do | B | | 50° C | Slightly thixotropic. |
| 8 | do | B | 5% dimethyl phthalate | Ambient | Fluid. |
| 9 | do | C | | do | Do. |
| 10 | Breon 121* | D | | do | Do. |
| 11 | do | B | | 50° C | Do. |
| 12 | do | B | | Ambient | Very thixotropic. |
| 13 | do | C | | do | Fluid. |
| 14 | do | B | 5% dimethyl phthalate | do | Do. |
| 15 | do | F | | do | Do. |
| 16 | Vinylite QYNV* | B | | Ambient | Very thixotropic. |
| 17 | do | B | | 50° C | Fluid, slightly thixotropic. |
| 18 | do | B | 5% dimethyl phthalate | Ambient | Fluid. |

| | Particulate polymer | Stabiliser | Further liquid additive | Temperature | $\eta_1$ | $\eta_2$ | $\eta_3$ |
|---|---|---|---|---|---|---|---|
| 19 | Breon 121* | C | | do | 29.5 | 31.5 | 17.5 |
| 20 | do | B | | 50° C | 32.0 | 42.0 | 25.0 |
| 21 | do | B | 5% dioctyl phthalate | Ambient | 85.0 | 133 | 50.0 |
| 22 | do | B | | do | 130 | 195 | 65.0 |
| 23 | do | | 5% dioctyl phthalate | do | 1,010 | 1,335 | 275 |
| 24 | do | | | do | 760 | 1,060 | 255 |

NOTE.—$\eta_1$ = Viscosity in centipoises at shear rate 100 secs.$^{-1}$ after being heavily sheared. $\eta_2$ = Viscosity in centipoises at shear rate 100 secs.$^{-1}$ previously unsheared, $\eta_3$ = Viscosity in centipoises at 600 secs.$^{-1}$ $\eta_1$ minus $\eta_3$ = measure of non-Newtonian behaviour; $\eta_2$ minus $\eta_1$ = measure of thixotropy; $\eta_3$ = direct measure of viscosity of material at normal shears.

In a perfectly Newtonian liquid $\eta_1 = \eta_2 = \eta_3$ and in the above table the best dispersions are indicated by low absolute figures and low differences between them. In this respect Examples 19, 20 and 21 are notable.

EXAMPLE 25

Tray-dried polystyrene (Lytron 615 [1]) was ball-milled at 40% by weight solids content in odourless white spirit for 18 hours at room temperature with stabiliser C (5%

[1] Registered trademark.

by weight on particulate polymer). This gave a fluid dispersion.

EXAMPLE 26

When stabiliser C in Example 25 was replaced by stabiliser E a very thixotropic dispersion was obtained, but if the milling was done at 50° C., the dispersion was only slightly thixotropic.

EXAMPLE 27

A mixture of 50 parts of polymethyl methacrylate particles (size 3–5$\mu$) and 2.5 parts of stabiliser A, 2.5 parts of dimethyl phthalate and 50 parts of odourless white spirit was milled for 18 hours at room temperature to give a fluid dispersion free from gross aggregates. In the absence of dimethyl phthalate the product was in a flocculated condition.

EXAMPLE 28

A mixture of 100 parts by weight of polyvinylidene fluoride powder, 5 parts by weight of stabiliser C and 60 parts by weight of aliphatic hydrocarbon (boiling range 150–190° C.) was milled for 5 hours to give a fluid, fine-particle dispersion.

EXAMPLE 29

A mixture of 100 parts by weight of chloroprene powder, 5 parts by weight of stabiliser F and 100 parts by weight of aliphatic hydrocarbon (boiling range 150–190° C.) was bead-milled for one hour to give a slightly thixotropic, fine-particle dispersion.

EXAMPLE 30

A stabiliser G was prepared by a process similar to that described in (C) above except that the ethyl acrylate was replaced by an equal weight of acrylonitrile. A mixture of 100 parts by weight of polyacrylonitrile powder, 5 parts by weight of stabiliser G, 50 parts of ethyl acetate and 50 parts of xylene was milled for 18 hours to give a fluid, fine-particle dispersion.

EXAMPLE 31

A stabiliser H was prepared by reacting at 150° C. 1,800 parts by weight of a self-ester of 12 hydroxy stearic acid of molecular weight about 1,800 with 900 parts by weight of a condensate of epichlorhydrin and diphenylol propane of molecular weight about 900 (commercially available as Epikote [2] 1001) in the presence of N-dodecyl dimethylamine as catalyst.

A mixture of 100 parts by weight of P.V.C. powder, 5 parts by weight of stabiliser H and 60 parts of an aliphatic hydrocarbon (boiling range 150–190° C.) was milled for 18 hours to give a fluid, fine-particle dispersion.

A similar result was obtained using a stabiliser similar to H but made from 1,500 parts by weight of a similar condensate of molecular weight about 1,500, commercially-available as Epikote [3] 1004.

EXAMPLE 32

A stabiliser I was prepared by a process similar to that described in (B) above but replacing the 50 parts of methyl methacrylate monomer by an equal weight of $\beta$-ethoxy ethyl methacrylate. A mixture of 100 parts by weight of P.V.C. powder, 5 parts by weight of stabiliser I and 60 parts by weight of an aliphatic hydrocarbon (boiling range 150–190° C.) was milled for 18 hours to give a fluid, fine-particle dispersion.

EXAMPLE 33

A stabiliser J was prepared by (i) reacting a copolymer of lauryl methacrylate and glycidyl methacrylate (97:5 by weight and molecular weight about 30,000) with methacrylic acid to attach ethylenically unsaturated groups thereto, and (ii) copolymerising 50 parts by weight of this modified copolymer with 30 parts by weight of ethyl acrylate and 30 parts by weight of methyl methacrylate to produce a copolymer of total molecular weight about 60,000.

A mixture of 100 parts by weight of P.V.C. powder, 5 parts by weight of stabiliser J and 60 parts by weight of an aliphatic hydrocarbon (boiling range 150–190° C. was milled for 18 hours to give a fluid, fine-particle dispersion.

EXAMPLE 34

A series of stabilisers were prepared as described in (B) above, except that varying proportions by weight of the 50 parts of methyl methacrylate monomer were replaced by lauryl methacrylate.

A mixture of 100 parts by weight of P.V.C. powder, 60 parts by weight of an aliphatic hydrocarbon and 5 parts by weight of each stabiliser was milled for 18 hours. The most fluid dispersions were obtained using stabilisers in which from 4% to 10% of the methyl methacrylate had been replaced by lauryl methacrylate.

EXAMPLE 35

A mixture of 100 parts by weight of P.V.C. powder, 5 parts by weight of stabiliser B and 60 parts by weight of a solvent blend consisting of $x$ parts by weight of butyl acetate and 60−$x$ parts by weight of an aliphatic hydrocarbon (boiling range 150–190° C.) was milled for 18 hours. When $x$ was greater than 30 parts, the P.V.C. particles were swollen by the solvent-containing liquid and the dispersion was a thick paste. The most fluid dispersion was obtained when $x$ was 12 parts.

The proportion of stabiliser to be used is in the range 1–25% by weight of the polymer to be dispersed. Smaller particles require a higher proportion of stabiliser and for particles in the size range 0.1–1$\mu$ the stabiliser proportion is suitably in the range 1–10%.

We claim:

1. A process of making a dispersion of particles of polymer in an organic liquid by dispersing pre-formed particles of the polymer in the liquid in the presence of a stabilizer comprising in its molecule one component which is solvated by the organic liquid and another component of different polarity which is relatively non-solvated by the organic liquid and becomes associated with the polymer particles, thereby attaching to the particles a sterically stabilizing sheath of the solvated component of the stabilizer, the associated component of the stabilizer being under the conditions in which the dispersion is made, a plastic solid or viscous liquid such that where a bulk polymer having the composition and molecular weight of the associated component is added to the liquid of the dispersion in the proportion in which said associated component is to be present in the dispersion, and it is allowed to equilibrate with the liquid under the conditions at which said process is to be carried out, forms a separate layer which is deformable when subjected to an applied force so that a weight or the end of a loaded rod steadily sinks into the layer.

2. A process as claimed in claim 1 in which the polymer particles have been pre-formed in an aqueous emulsion polymerisation process.

3. A process as claimed in claim 1 in which the disperse particles are of a polymer or copolymer of vinyl or vinylidene chloride or fluoride.

4. A process as claimed in claim 1 in which the organic liquid is substantially a hydrocarbon.

5. A process as claimed in claim 4 in which the liquid is substantially a mixture of a hydrocarbon and a solvent or plasticiser for the polymer.

6. A process of making a dispersion in an organic liquid of particles of a polymer which is a member of the group consisting of polymers and copolymers of vinyl chloride, vinylidene, chloride, vinyl fluoride and vinylidene fluoride, ---
[2] Registered trademark.
[3] Registered trademark.

by dispersing pre-formed particles of said polymer which have been made by a process of aqueous emulsion polymerization, in an organic liquid which is a non-solvent for the polymer and which is substantially a hydrocarbon or a mixture thereof with a solvent or plasticiser for the polymer, in the presence of a stabilizer comprising in its molecule one component which is solvated by the organic liquid and another component of different polarity which is relatively non-solvated by the organic liquid and becomes associated with the polymer particles, thereby attaching to the particles a sterically stabilizing sheath of the solvated component of the stabilizer, the associated component of the stabilizer being, under the conditions in which the dispersion is made, a plastic solid or viscous liquid such that where a bulk polymer having the composition and molecular weight of the associated component is added to the liquid of the dispersion in the proportion in which said associated component is to be present in the dispersion, and it is allowed to equilibrate with the liquid under the conditions at which said process is to be carried out, forms a separate layer which is deformable when subjected to an applied force so that a weight or the end of a loaded rod steadily sinks into the layer.

References Cited

UNITED STATES PATENTS 3,331,801   7/1967   Osmond et al. _____ 260—33.60

FOREIGN PATENTS 941,305   11/1963   Great Britain _____ 260—34.2

ALLAN LIEBERMAN, Primary Examiner